United States Patent
Ebrahimi Afrouzi

(10) Patent No.: US 10,986,971 B1
(45) Date of Patent: Apr. 27, 2021

(54) CHARGING STATION WITH MAGNETIC CHARGING CONTACTS FOR MOBILE ROBOTIC DEVICE

(71) Applicant: Ali Ebrahimi Afrouzi, San Jose, CA (US)

(72) Inventor: Ali Ebrahimi Afrouzi, San Jose, CA (US)

(*) Notice: Subject to any disclaimer, the term of this patent is extended or adjusted under 35 U.S.C. 154(b) by 152 days.

(21) Appl. No.: 16/241,436

(22) Filed: Jan. 7, 2019

Related U.S. Application Data

(60) Provisional application No. 62/615,122, filed on Jan. 9, 2018.

(51) Int. Cl.
   *H02J 7/00* (2006.01)
   *A47L 9/28* (2006.01)
   *H02G 11/02* (2006.01)

(52) U.S. Cl.
   CPC ............ *A47L 9/2873* (2013.01); *H02G 11/02* (2013.01); *H02J 7/0044* (2013.01); *A47L 2201/022* (2013.01)

(58) Field of Classification Search
   CPC . A47L 9/2873; A47L 2201/022; H02G 11/02; H02J 7/0044
   See application file for complete search history.

(56) References Cited

U.S. PATENT DOCUMENTS

| | | | |
|---|---|---|---|
| 3,705,962 A | 12/1972 | Banister | |
| 4,842,108 A | 6/1989 | Anderson et al. | |
| 5,701,981 A | 12/1997 | Marshall et al. | |
| 6,059,081 A | 5/2000 | Patterson et al. | |
| 6,082,656 A | 7/2000 | Thornton | |
| 6,230,860 B1 | 5/2001 | Wu | |
| 6,264,016 B1 | 7/2001 | Bales | |
| 6,540,168 B1 | 4/2003 | Archer et al. | |
| 6,578,683 B1 | 6/2003 | Burke et al. | |
| 6,616,080 B1 | 9/2003 | Edwards et al. | |
| 6,803,525 B1 | 10/2004 | Liao | |
| 7,017,846 B2 | 3/2006 | Tsoi et al. | |
| 7,364,109 B2 | 4/2008 | Kuo | |
| 9,038,795 B2 | 5/2015 | Ichikawa | |
| 9,272,876 B2 | 3/2016 | Draganovic et al. | |
| 9,392,349 B2 | 7/2016 | Merenda | |
| 9,487,100 B2 * | 11/2016 | Hamrin | B60L 53/18 |
| 2004/0256188 A1 | 12/2004 | Harcourt | |
| 2007/0267998 A1 * | 11/2007 | Cohen | A47L 9/2873 320/109 |
| 2017/0267114 A1 * | 9/2017 | Bianco | B65H 75/4484 |

* cited by examiner

*Primary Examiner* — Arun C Williams

(57) ABSTRACT

Provided is a charging station of a mobile robotic device including: a main housing with an opening; a signal receiver coupled to the main housing for receiving signals from a transmitter of the mobile robotic device; a reel disposed within the main housing; a motor coupled to the reel to drive rotation of the reel in two directions; a charging cable wound around the reel with one or more magnetic charging contacts on a terminal end thereof, the one or more magnetic charging contacts of the charging cable connecting to corresponding one or more magnetic charging contacts of the mobile robotic device for charging of the mobile robotic device; an electrical plug coupled to the main housing to connect to a power supply; and one or more electrical elements electrically coupling the electrical plug to the charging cable and the motor.

20 Claims, 7 Drawing Sheets

CHARGING STATION WITH MAGNETIC CHARGING CONTACTS FOR MOBILE ROBOTIC DEVICE

CROSS-REFERENCE TO RELATED APPLICATIONS

This application claims the benefit of Provisional Patent Application No. 62/615,122 filed Jan. 9, 2018, which is hereby incorporated by reference.

In this patent, certain U.S. patents, U.S. patent applications, or other materials (e.g., articles) have been incorporated by reference. Specifically, U.S. patent application Ser. Nos. 15/919,031 and 15/917,096 are hereby incorporated by reference in their entirety. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

This disclosure relates to charging stations for mobile robotic devices. More particularly, this disclosure relates to charging stations with magnetic charging contacts providing autonomous docking and charging for mobile robotic devices.

BACKGROUND

Mobile robotic devices are used for a variety of applications within consumer homes and commercial establishments. Mobile robotic devices use a rechargeable battery to operate and once the battery is drained, recharge the battery at a charging station. Charging stations of mobile robotic devices can be bulky, contain loose cords, and be aesthetically unpleasing.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some aspects provide a charging station of a mobile robotic device including: a main housing with an opening; a signal receiver coupled to the main housing for receiving signals from a transmitter of the mobile robotic device; a reel disposed within the main housing; a motor coupled to the reel to drive rotation of the reel in two directions; a charging cable wound around the reel with one or more magnetic charging contacts on a terminal end thereof, the one or more magnetic charging contacts of the charging cable connecting to corresponding one or more magnetic charging contacts of the mobile robotic device for charging of the mobile robotic device; an electrical plug coupled to the main housing to connect to a power supply; and one or more electrical elements electrically coupling the electrical plug to the charging cable and the motor, whereby the charging cable extends through the opening of the main housing by rotation of the reel in a first direction upon the signal receiver receiving signals transmitted from the transmitter of the mobile robotic device and retracts through the opening of the main housing by rotation of the reel in a second direction upon the signal receiver detecting the absence of signals transmitted from the transmitter of the mobile robotic device.

Some aspects provide a charging station of a mobile robotic device including: a main housing with an opening; a signal receiver coupled to the main housing for receiving signals from a transmitter of the mobile robotic device; a reel disposed within the main housing; a motor coupled to the reel to drive rotation of the reel in two directions; a charging cable wound around the reel with one or more magnetic charging contacts on a terminal end thereof, the one or more magnetic charging contacts of the charging cable connecting to corresponding one or more magnetic charging contacts of the mobile robotic device for charging of the mobile robotic device; an electrical plug coupled to the main housing to connect to a power supply; and one or more electrical elements electrically coupling the electrical plug to the charging cable and the motor, whereby the charging cable extends through the opening of the main housing by rotation of the reel in a first direction upon the signal receiver receiving a first unique signal transmitted from the transmitter of the mobile robotic device and retracts through the opening of the main housing by rotation of the reel in a second direction upon the signal receiver receiving a second unique signal transmitted from the transmitter of the mobile robotic device.

Some aspects provide a charging station of a mobile robotic device including: a main housing with an opening; a signal transmitter coupled to the main housing for transmitting signals to a receiver of the mobile robotic device; a signal receiver coupled to the main housing for receiving signals from a transmitter of the mobile robotic device; a reel disposed within the main housing; a motor coupled to the reel to drive rotation of the reel in two directions; a charging cable wound around the reel with one or more magnetic charging contacts on a terminal end thereof, the one or more magnetic charging contacts of the charging cable connecting to corresponding one or more magnetic charging contacts of the mobile robotic device for charging of the mobile robotic device; an electrical plug coupled to the main housing to connect to a power supply; and one or more electrical elements electrically coupling the electrical plug to the charging cable and the motor, whereby the signal transmitter of the mobile robotic device transmits return signals to the signal receiver of the charging station upon receiving signals transmitted by the signal transmitter of the charging station when approaching for charging, and whereby the charging station extends the charging cable through the opening of the main housing by rotation of the reel in a first direction upon the signal receiver of the charging station receiving the return signals transmitted from the transmitter of the mobile robotic device and retracts through the opening of the main housing by rotation of the reel in a second direction upon the signal receiver of the charging station detecting the absence of return signals transmitted from the transmitter of the mobile robotic device.

Some aspects provide a charging station of a mobile robotic device including: a main housing with an opening; a sensor coupled to the main housing for detecting the presence of the mobile robotic device within a predetermined range; a reel disposed within the main housing; a motor coupled to the reel to drive rotation of the reel in two directions; a charging cable wound around the reel with one or more magnetic charging contacts on a terminal end thereof, the one or more magnetic charging contacts of the charging cable connecting to corresponding one or more magnetic charging contacts of the mobile robotic device for charging of the mobile robotic device; an electrical plug coupled to the main housing to connect to a power supply; and one or more electrical elements electrically coupling the electrical plug to the charging cable and the motor, whereby the charging cable extends through the opening of the main housing by rotation of the reel in a first direction upon the sensor detecting the mobile robotic device within the predetermined range and retracts through the opening of the main housing by rotation of the reel in a second direction upon the sensor detecting the absence of the mobile robotic device within the predetermined range.

DETAILED DESCRIPTION OF SOME EMBODIMENTS

Figure 1A:
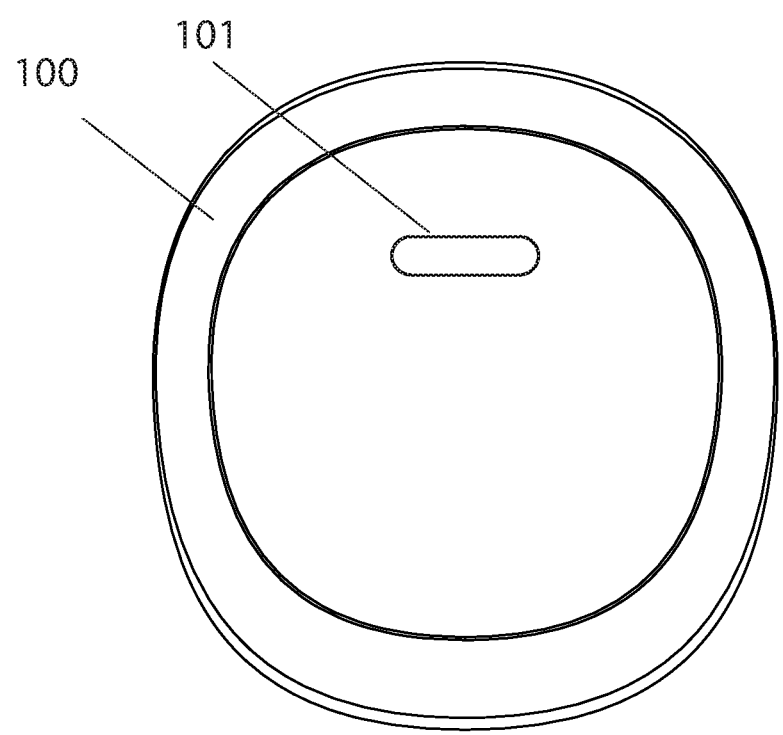
FIGS. 1A-1C illustrate a charging station with magnetic charging contacts retracted according to some embodiments.

The present inventions will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments provide a charging station for a mobile robotic device including a main housing with electrical prongs, an opening in the main housing through which a charging cable housed within the main housing retracts and extends, a radio frequency (RF) receiver, and one or more magnetic charging contacts disposed at a terminal end of the charging cable, wherein the terminal end of the charging cable with disposed one or more magnetic charging contacts is retracted within the main housing when charging mode is inactive and is extended through the opening in the main housing when charging mode is active.

In some embodiments, the mobile robotic device includes one or more magnetic charging contacts corresponding with the one or more magnetic charging contacts disposed on the charging cable of the charging station. In some embodiments, the poles of the one or more magnetic charging contacts of the mobile robotic device are opposite to the poles of the corresponding one or more magnetic charging contacts of the charging station. In some embodiments, the mobile robotic device aligns its one or more magnetic charging contacts with the corresponding one or more magnetic charging contacts of the charging station using sensors of the mobile robotic device. The magnetic property of the charging contacts aids in autonomously securing a connection between the one or more charging contacts of the charging station and the corresponding one or more charging contacts of the mobile robotic device as they are attracted to one another.

In some embodiments, the RF receiver of the charging station receives signals transmitted by an RF transmitter disposed on the mobile robotic device. When an omnidirectional radio signal transmitted from the RF transmitter disposed on the mobile robotic device is within the range of the RF receiver disposed on the charging station, the RF receiver detects the signals and subsequently the presence of the mobile robotic device approaching for charging. Once the mobile robotic device is detected by the charging station, the charging station enters charging mode which causes a cable retraction-extension mechanism to extend the terminal end of the charging cable with disposed one or more magnetic charging contacts through the opening in the main housing for charging of the mobile robotic device. When the RF receiver of the charging station no longer detects the signals transmitted from the RF transmitter of the mobile robotic device, the charging station ceases charging mode which causes the cable retraction-extension mechanism to retract the terminal end of the charging cable with disposed one or more magnetic charging contacts through the opening into the main housing. In some embodiments, the RF transmitter disposed on the mobile robotic device only transmits signals when charging is required and once charging is complete, the RF transmitter stops transmitting signals.

In some embodiments, the charging station further includes a RF transmitter and the mobile robotic device further includes a RF receiver. In some embodiments, the RF receiver disposed on the mobile robotic device receives the signals transmitted by the RF transmitter of the charging station, and if charging is required, the RF transmitter disposed on the mobile robotic device transmits return signals to the RF receiver of the charging station. Upon receipt of the return signals by the RF receiver of the charging station, the charging station enters charging mode which causes the cable retraction-extension mechanism to extend the terminal end of the charging cable with disposed one or more magnetic charging contacts through the opening in the main housing for charging of the mobile robotic device. When the RF receiver of the charging station no longer detects the return signals transmitted from the RF transmitter of the mobile robotic device, the charging station ceases charging mode which causes the cable retraction-extension mechanism to retract the terminal end of the charging cable with disposed one or more magnetic charging contacts through the opening into the main housing. This avoids the charging station extending the charging cable when the mobile robotic device is nearby but charging is not required. In some embodiments, wireless signals, such as RF, infrared, satellite, radar, radio, Bluetooth, Wi-Fi, etc., are used for communication between the charging station and mobile robotic device.

In some embodiments, the mobile robotic device disconnects its one or more magnetic charging contacts from the corresponding one or more magnetic charging contacts of the charging station by driving in a direction away from the charging station. In some embodiments, the charging station disconnects its one or more magnetic charging contacts from the corresponding one or more magnetic charging contacts of the mobile robotic device by retracting the charging cable. In some embodiments, the one or more magnetic charging contacts of the mobile robotic device and charging station are disconnected by the mobile robotic device driving in the direction away from the charging station and the charging station simultaneously retracting the cable.

In some embodiments, the retraction-extension mechanism includes a motor attached to a reel around which the charging cable is wound. The motor causes rotation of the reel in one direction to extend the charging cable and in the opposite direction to retract the charging cable. In some embodiments, the charging cable is extended and retracted by manually rotating the wheel using a handle. In some embodiments, the charging cable is extended by pulling the charging cable and retracted by pushing a button disposed on the charging station or by a rapid tug of the charging cable that releases a torsion spring loaded reel to retract the charging cable. An example of such a mechanism is detailed in U.S. patent application Ser. No. 15/919,031, the entire contents of which is hereby incorporated by reference. In other embodiments, other retraction-extension mechanisms are used to retract and extend the charging cable through the opening in the main housing.

In some embodiments, the charging station uses other methods for detecting the mobile robotic device approaching for charging. In some embodiments, a visual or imaging sensor is disposed on the charging station and the charging station detects the mobile robotic device approaching when the visual sensor detects the mobile robotic device in its field of view. In other embodiments, an acoustic sensor disposed on the charging station detects a particular auditory frequency transmitted by a sensor disposed on the mobile robotic device when it is within a predetermined range from the auditory sensor of the charging station. In some embodiments, a signal receiver disposed on the charging station detects a first unique signal (e.g., a signal including a unique sequence of numbers) transmitted by a signal transmitter of the mobile robotic device when charging is required and a second unique signal transmitted by a signal transmitter of the mobile robotic device when charging is no longer required. In other embodiments, other sensors (e.g., IR sensors, LIDAR, LADAR, distance sensors, RF sensors, etc.) can be used by the charging station to detect the presence and absence of the mobile robotic device.

In some embodiments, the electrical prongs of the charging station are plugged into an electrical socket. In some embodiments, the electricity from the electrical socket powers the retraction-extension mechanism and charging of the mobile robotic device. In some embodiments, the connection between the magnetic charging contacts of the charging station and the corresponding magnetic charging contacts of the mobile robotic device completes an electrical charging circuit that allows electricity to flow to the mobile robotic device for charging. In some embodiments, the charging station retracts the charging cable when the electrical charging circuit is incomplete.

In some embodiments, the charging station waits a predetermined amount of time before retracting the charging cable upon detecting charging is no longer required. In some embodiments, the charging station extends the charging cable upon detecting charging is required for a predetermined amount of time (e.g., after receiving a signal for a predetermined amount time).

In some embodiments, a length that the charging cable extends for charging of the mobile robotic device is adjustable. In some embodiments, a user configures the length that the charging cable extends for charging of the mobile robotic device using input buttons provided on the charging station. In some embodiments, the charging station extends the charging cable until a connection between the magnetic charging contacts of the charging station and the corresponding magnetic charging contacts of the mobile robotic device is detected by, for example, a completed electrical charging circuit. In some embodiments, the charging station retracts the charging cable the same length as extended. In some embodiments, the charging station retracts the charging cable until a sensor of the charging station detects that the one or more charging contacts are within the main housing.

Figure 1B:
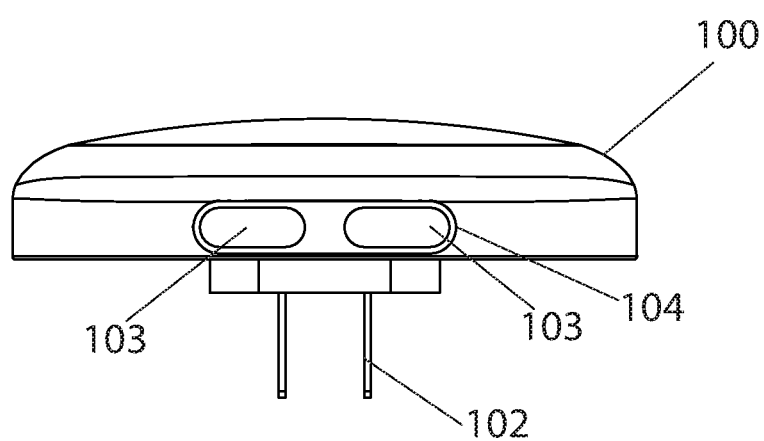
Figure 1C:
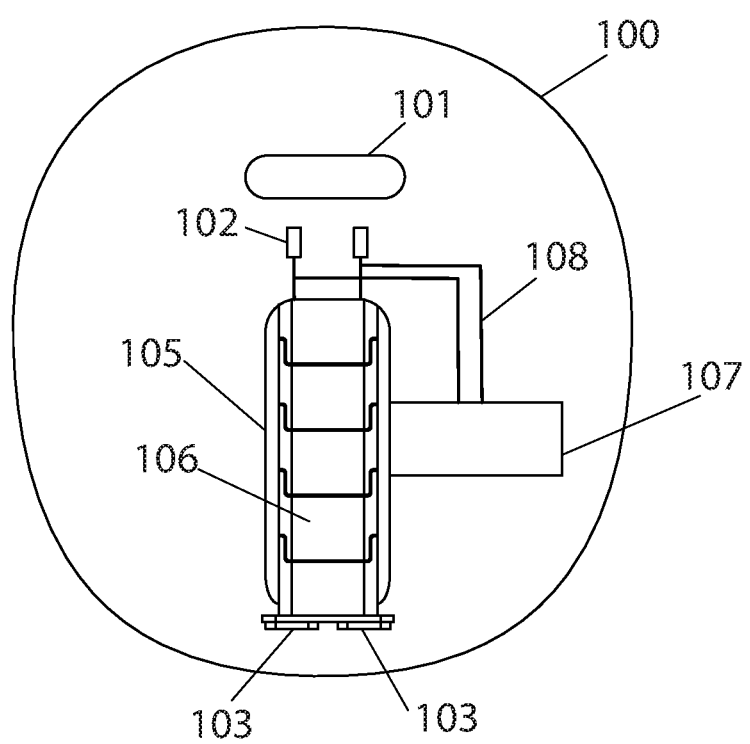

FIG. 1A illustrates a front view of a charging station including main housing 100 and wireless signal receiver 101 for receiving wireless signals transmitted from a wireless signal transmitter of a corresponding mobile robotic device. FIG. 1B illustrates a bottom view of the charging station including main housing 100, electrical prongs 102, magnetic charging contacts 103, and opening 104 of main housing 100 through which a charging cable (not shown) on which magnetic charging contacts 103 are disposed extends and retracts. FIG. 1C illustrates a cross-sectional front view of the charging station including main housing 100, wireless signal receiver 101, reel 105 around which charging cable 106 with magnetic charging contacts 103 is wound, motor 107 for driving the reel to extend and retract magnetic charging contacts 103 disposed at the terminal end of charging cable 106, and electrical elements 108 (e.g., electrical wires) coupling with electrical prongs 102 with charging cable 106 and motor 107 to provide power to motor 107 and electricity to magnetic charging contacts 103 through charging cable 106 when connected with corresponding magnetic charging contacts of the mobile robotic device (not shown) to charge the mobile robotic device. In FIGS. 1A-1C charging cable 106 is retracted within main housing 100 as charging mode is deactivated.

Figure 2:
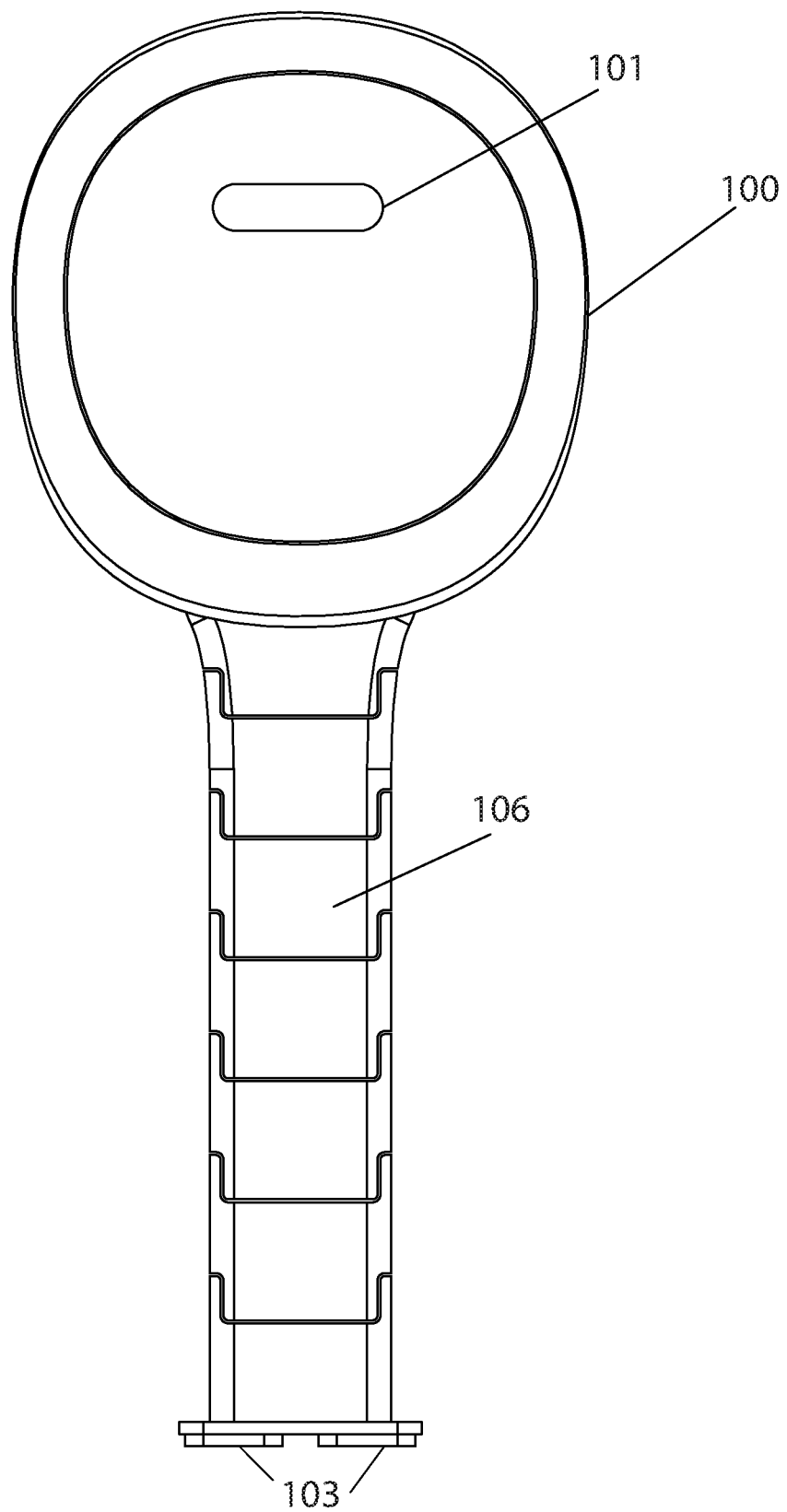
FIG. 2 illustrates a charging station with magnetic charging contacts extended according to some embodiments.

FIG. 2 illustrates a front view of the charging station with wireless signal receiver 101 and charging cable 106 with magnetic charging contacts 103 disposed thereon extended from within main housing 100. In some embodiments, charging cable 106 includes links connected to one another. In some embodiments, links can be added or removed to adjust the length of the charging cable 106. For example, links are added or removed to adjust the length of charging cable 106 depending on the height of an electrical wall socket to which the charging station is plugged. In other embodiments, charging cable 106 is a continuous cord, such as a cord of a mobile phone charger or a laptop charger. In FIG. 2 charging cable 106 is extended from within main housing 100 as charging mode is activated.

Figure 3A:
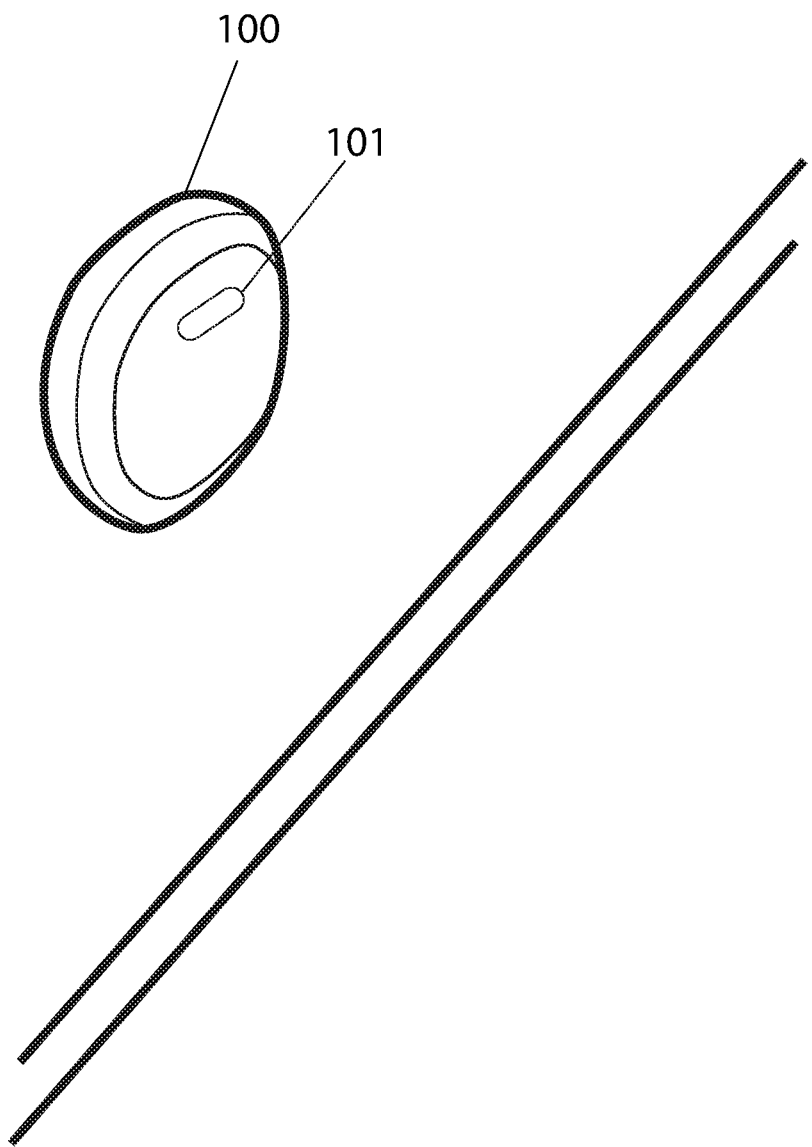
FIGS. 3A and 3B illustrate a charging station extending magnetic charging contacts upon detecting a mobile robotic device approaching for charging according to some embodiments.
Figure 3B:
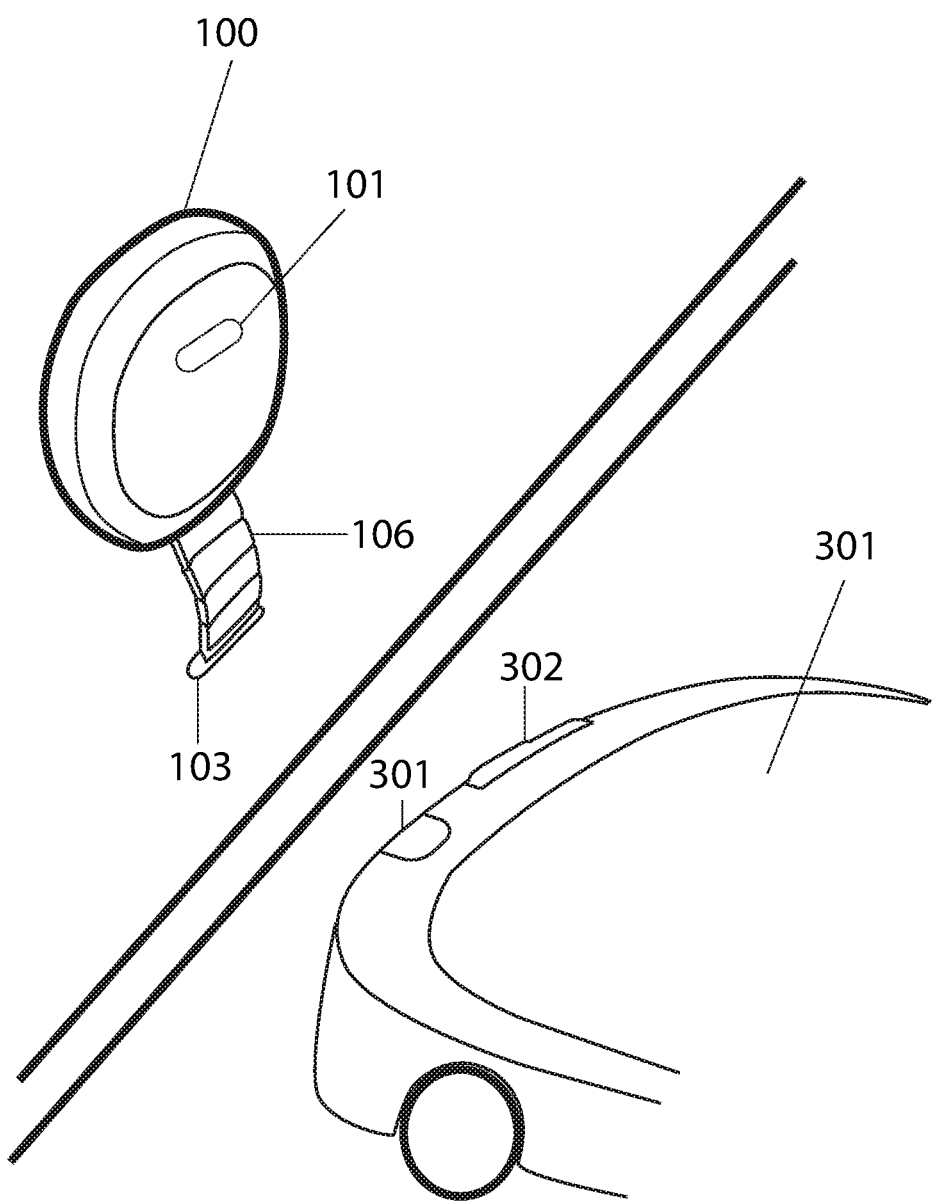

FIG. 3A illustrates the charging station with charging cable 106 (not shown) retracted within main housing 100, as charging mode is deactivated as a result of wireless signal receiver 101 detecting an absence of wireless signals transmitted from a wireless transmitter of the mobile robotic device (not shown). In FIG. 3B wireless signal receiver 101 receives wireless signals transmitted by wireless signal transmitter 300 disposed on mobile robotic device 301. Mobile robotic device 301 transmits signals from wireless signal transmitter 300 when approaching for charging. Upon wireless signal receiver 101 of the charging station receiving wireless signals transmitted by wireless signal transmitter 300 of mobile robotic device 301, the charging station enters charging mode which causes a cable retraction-extension mechanism to extend charging cable 106 with disposed magnetic charging contacts 103 through opening 104 (not shown) in main housing 100 for charging of mobile robotic device 301. Mobile robotic device 300 aligns its magnetic charging contacts 302 with magnetic charging contacts 103 of the charging station. Magnetic charging contacts 302 of mobile robotic device 300 has opposite poles to corresponding magnetic charging contacts 103 of the charging station. The magnetic property of charging contacts 302 and 103 aids in autonomously securing a connection for charging as they are attracted to one another. When charging is complete wireless signal transmitter 300 disposed on mobile robotic device 301 ceases transmission of signals and begins to move in a direction away from the charging station. When wireless signal receiver 104 of the charging station no longer detects the signals transmitted wireless signal transmitter 300 of mobile robotic device 301, the charging station ceases charging mode which causes the cable retraction-extension mechanism to retract charging cable 106 with disposed magnetic charging contacts 103 through opening 104 (not shown) into main housing 100. The charging station with retracted charging cable 106 is shown in FIG. 3A.

Figure 4:
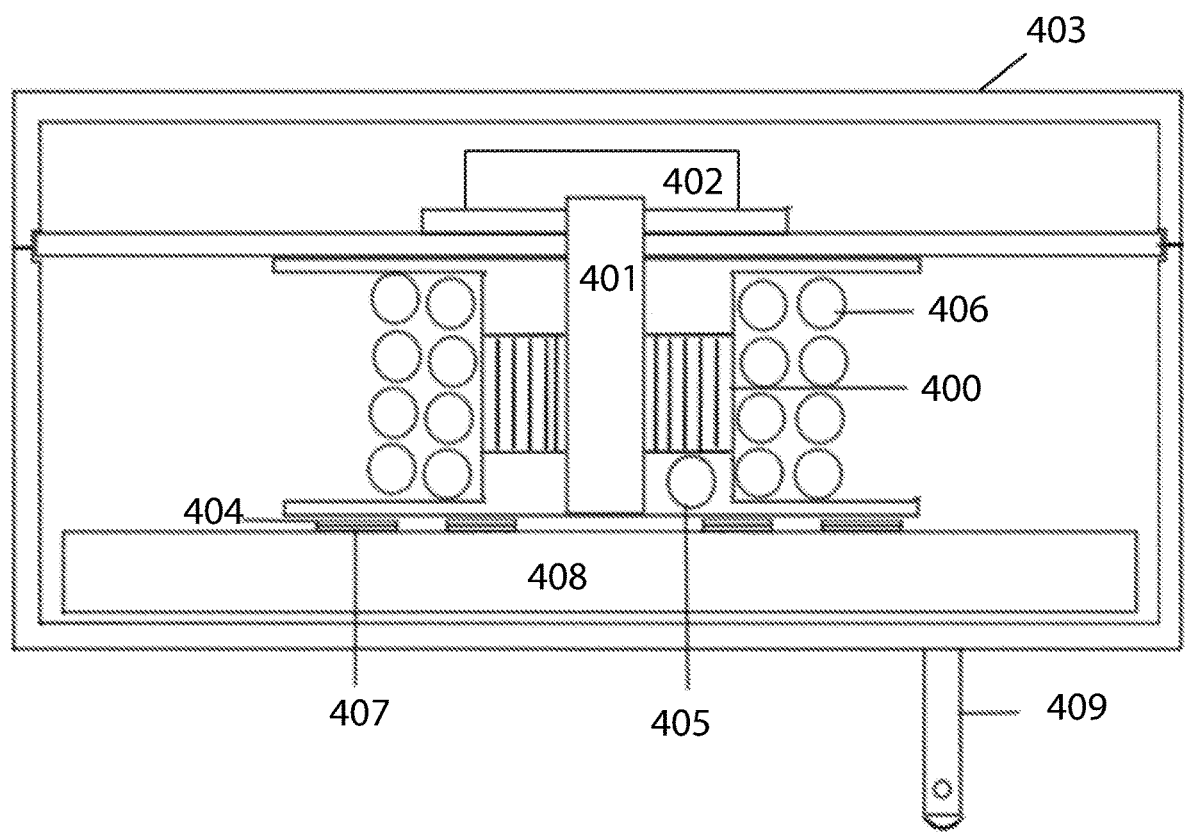
FIG. 4 illustrates an example of a retraction-extension mechanism of a charging cable according to some embodiments.

FIG. 4 illustrates a cross sectional side view of an example of a retraction-extension mechanism of a charging station. Rotatable spool 400 coupled to axle 401 of motor 402 is concentrically centered within main housing 403 of the charging station. Two circular electrical contacts 404 are installed on the underside of spool 400, one negative and one positive, such that terminal end 405 of charging cable 406 can be connected to electrical contacts 404. Another two circular electrical contacts 407 are installed on top of electrical hardware compartment 408, one positive and one negative, such that electrical wall plug 409 can be connected to electrical contacts 407. Contacts 404 and 407 are positioned adjacent to one another within main housing 403 such that continuous contact is made when spool 400 is rotated and charging cable 406 is extended from main housing 403 through an opening of the main housing for charging of a mobile robotic device.

The charging station with retractable charging cable is not intended as being limited in applicability for particular types of robotic devices. A multitude of types of different robotic devices can use charging stations with a retractable charging cables. For example, robotic cleaning devices, robotic towing devices, robotic devices that can carry and transport any type of payload, robotic security devices, robotic vehicles, robotic waiters, robotic shopping carts, robotic refuse containers, and the like. In an alternative embodiment, a single charging station with retractable charging cable is used for the charging of multiple different types of robotic devices.

This invention is not intended to be limited in scope to the use of magnetic charging contacts being disposed on a terminal end of a charging cable which extends from within a main body of a charging station. In another embodiment, the magnetic charging contacts will extend from the main body of the charging station in a configuration other than that of the charging cable. For example, a charging station including one or more prongs that extend from within a main body of a charging station on which magnetic charging contacts are disposed may be used. An example of a charging station with retractable prongs is detailed in U.S. patent application Ser. No. 15/917,096, the entire contents of which is hereby incorporated by reference.

In some embodiments, the charging contacts are not magnetic. In some embodiments, the charging station does not plug directly into an electrical wall socket. For example, the charging station rests on a floor surface and an electrical cord extending from the charging station is plugged in an electrical wall socket.

In block diagrams provided herein, illustrated components are depicted as discrete functional blocks, but embodiments are not limited to systems in which the functionality described herein is organized as illustrated. The functionality provided by each of the components may be provided by software or hardware modules that are differently organized than is presently depicted. For example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The present techniques will be better understood with reference to the following enumerated embodiments:

1. A charging station of a mobile robotic device comprising: a main housing with an opening; a signal receiver coupled to the main housing for receiving signals from a transmitter of the mobile robotic device; a reel disposed within the main housing; a motor coupled to the reel to drive rotation of the reel in two directions; a charging cable wound around the reel with one or more magnetic charging contacts on a terminal end thereof, the one or more magnetic charging contacts of the charging cable connecting to corresponding one or more magnetic charging contacts of the mobile robotic device for charging of the mobile robotic device; an electrical plug coupled to the main housing to connect to a power supply; and one or more electrical elements electrically coupling the electrical plug to the charging cable and the motor, whereby the charging cable extends through the opening of the main housing by rotation of the reel in a first direction upon the signal receiver receiving signals transmitted from the transmitter of the mobile robotic device and retracts through the opening of the main housing by rotation of the reel in a second direction upon the signal receiver detecting the absence of signals transmitted from the transmitter of the mobile robotic device.

2. The charging station of embodiment 1, wherein the receiver detects signals transmitted from the transmitter of the mobile robotic device when the transmitter is within a predetermined range from the receiver.

3. The charging station of embodiments 1-2, wherein the transmitter of the mobile robotic device only transmits signals when charging is required.

4. The charging station of embodiments 1-3, wherein the charging station extends the charging cable after the receiver receives signals transmitted from the transmitter of the mobile robotic device for a predetermined amount of time.

5. The charging station of embodiments 1-4, wherein the charging station retracts the charging cable after the receiver detects the absence of signals transmitted from the transmitter of the mobile robotic device for a predetermined amount of time.

6. The charging station of embodiments 1-5, wherein the one or more magnetic charging contacts of the charging station and the corresponding one or more magnetic charging contacts of the mobile robotic device have opposite poles.

7. The charging station of embodiments 1-6, wherein connection between the one or more magnetic charging contacts of the charging station and the corresponding one or more magnetic charging contacts of the mobile robotic device complete an electrical charging circuit.

8. The charging station of embodiments 1-7, wherein a length that the charging cable extends for charging of the mobile robotic device is adjustable.

9. The charging station of embodiments 1-8, wherein the charging cable continues to extend until a connection between the one or more magnetic charging contacts of the charging station and the corresponding one or more magnetic charging contacts of the mobile robotic device is detected by a completed electrical charging circuit.

10. The charging station of embodiments 1-9, wherein the mobile robotic device is a mobile robotic cleaning device.

11. A charging station of a mobile robotic device comprising: a main housing with an opening; a signal receiver coupled to the main housing for receiving signals from a transmitter of the mobile robotic device; a reel disposed within the main housing; a motor coupled to the reel to drive rotation of the reel in two directions; a charging cable wound around the reel with one or more magnetic charging contacts on a terminal end thereof, the one or more magnetic charging contacts of the charging cable connecting to corresponding one or more magnetic charging contacts of the mobile robotic device for charging of the mobile robotic device; an electrical plug coupled to the main housing to connect to a power supply; and one or more electrical elements electrically coupling the electrical plug to the charging cable and the motor, whereby the charging cable extends through the opening of the main housing by rotation of the reel in a first direction upon the signal receiver receiving a first unique signal transmitted from the transmitter of the mobile robotic device and retracts through the opening of the main housing by rotation of the reel in a second direction upon the signal receiver receiving a second unique signal transmitted from the transmitter of the mobile robotic device.

12. The charging station of embodiment 11, wherein the transmitter of the mobile robotic device only transmits the first unique signal when the mobile robotic device is approaching for charging and the second unique signal when charging is complete.

13. The charging station of embodiments 11-12, wherein connection between the one or more magnetic charging contacts of the charging station and the corresponding one or more magnetic charging contacts of the mobile robotic device complete an electrical charging circuit.

14. The charging station of embodiments 11-13, wherein the charging cable continues to extend until a connection between the one or more magnetic charging contacts of the charging station and the corresponding one or more magnetic charging contacts of the mobile robotic device is detected by a completed electrical charging circuit.

15. The charging station of embodiments 11-14, wherein the mobile robotic device is a mobile robotic cleaning device.

16. A charging station of a mobile robotic device comprising: a main housing with an opening; a signal transmitter coupled to the main housing for transmitting signals to a receiver of the mobile robotic device; a signal receiver coupled to the main housing for receiving signals from a transmitter of the mobile robotic device; a reel disposed within the main housing; a motor coupled to the reel to drive rotation of the reel in two directions; a charging cable wound around the reel with one or more magnetic charging contacts on a terminal end thereof, the one or more magnetic charging contacts of the charging cable connecting to corresponding one or more magnetic charging contacts of the mobile robotic device for charging of the mobile robotic device; an electrical plug coupled to the main housing to connect to a power supply; and one or more electrical elements electrically coupling the electrical plug to the charging cable and the motor, whereby the signal transmitter of the mobile robotic device transmits return signals to the signal receiver of the charging station upon receiving signals transmitted by the signal transmitter of the charging station when approaching for charging, and whereby the charging station extends the charging cable through the opening of the main housing by rotation of the reel in a first direction upon the signal receiver of the charging station receiving the return signals transmitted from the transmitter of the mobile robotic device and retracts through the opening of the main housing by rotation of the reel in a second direction upon the signal receiver of the charging station detecting the absence of return signals transmitted from the transmitter of the mobile robotic device.

17. The charging station of embodiment 16, wherein the charging station extends the charging cable after the receiver receives return signals transmitted from the transmitter of the mobile robotic device for a predetermined amount of time.

18. The charging station of embodiments 16-17, wherein the charging station retracts the charging cable after the receiver detects the absence of return signals transmitted from the transmitter of the mobile robotic device for a predetermined amount of time.

19. A charging station of a mobile robotic device comprising: a main housing with an opening; a sensor coupled to the main housing for detecting the presence of the mobile robotic device within a predetermined range; a reel disposed within the main housing; a motor coupled to the reel to drive rotation of the reel in two directions; a charging cable wound around the reel with one or more magnetic charging contacts on a terminal end thereof, the one or more magnetic charging contacts of the charging cable connecting to corresponding one or more magnetic charging contacts of the mobile robotic device for charging of the mobile robotic device; an electrical plug coupled to the main housing to connect to a power supply; and one or more electrical elements electrically coupling the electrical plug to the charging cable and the motor, whereby the charging cable extends through the opening of the main housing by rotation of the reel in a first direction upon the sensor detecting the mobile robotic device within the predetermined range and retracts through the opening of the main housing by rotation of the reel in a second direction upon the sensor detecting the absence of the mobile robotic device within the predetermined range.

20. The charging station of embodiment 19, wherein the sensor comprises one or more of: imaging sensor, acoustic sensor, RF sensor, distance sensor, and IR sensor.

I claim:

1. A charging station of a mobile robotic device comprising:
   a main housing with an opening;
   a signal receiver coupled to the main housing for receiving signals from a transmitter of the mobile robotic device;
   a reel disposed within the main housing;
   a motor coupled to the reel to drive rotation of the reel in two directions;
   a charging cable wound around the reel with one or more magnetic charging contacts on a terminal end thereof, the one or more magnetic charging contacts of the charging cable connecting to corresponding one or more magnetic charging contacts of the mobile robotic device for charging of the mobile robotic device;

an electrical plug coupled to the main housing to connect to a power supply; and
one or more electrical elements electrically coupling the electrical plug to the charging cable and the motor,
whereby the charging cable extends through the opening of the main housing by rotation of the reel in a first direction upon the signal receiver receiving signals transmitted from the transmitter of the mobile robotic device and retracts through the opening of the main housing by rotation of the reel in a second direction upon the signal receiver detecting the absence of signals transmitted from the transmitter of the mobile robotic device.

2. The charging station of claim 1, wherein the receiver detects signals transmitted from the transmitter of the mobile robotic device when the transmitter is within a predetermined range from the receiver.

3. The charging station of claim 1, wherein the transmitter of the mobile robotic device only transmits signals when charging is required.

4. The charging station of claim 1, wherein the charging station extends the charging cable after the receiver receives signals transmitted from the transmitter of the mobile robotic device for a predetermined amount of time.

5. The charging station of claim 1, wherein the charging station retracts the charging cable after the receiver detects the absence of signals transmitted from the transmitter of the mobile robotic device for a predetermined amount of time.

6. The charging station of claim 1, wherein the one or more magnetic charging contacts of the charging station and the corresponding one or more magnetic charging contacts of the mobile robotic device have opposite poles.

7. The charging station of claim 1, wherein connection between the one or more magnetic charging contacts of the charging station and the corresponding one or more magnetic charging contacts of the mobile robotic device complete an electrical charging circuit.

8. The charging station of claim 1, wherein a length that the charging cable extends for charging of the mobile robotic device is adjustable.

9. The charging station of claim 1, wherein the charging cable continues to extend until a connection between the one or more magnetic charging contacts of the charging station and the corresponding one or more magnetic charging contacts of the mobile robotic device is detected by a completed electrical charging circuit.

10. The charging station of claim 1, wherein the mobile robotic device is a mobile robotic cleaning device.

11. A charging station of a mobile robotic device comprising:
a main housing with an opening;
a signal receiver coupled to the main housing for receiving signals from a transmitter of the mobile robotic device;
a reel disposed within the main housing;
a motor coupled to the reel to drive rotation of the reel in two directions;
a charging cable wound around the reel with one or more magnetic charging contacts on a terminal end thereof, the one or more magnetic charging contacts of the charging cable connecting to corresponding one or more magnetic charging contacts of the mobile robotic device for charging of the mobile robotic device;
an electrical plug coupled to the main housing to connect to a power supply; and
one or more electrical elements electrically coupling the electrical plug to the charging cable and the motor,
whereby the charging cable extends through the opening of the main housing by rotation of the reel in a first direction upon the signal receiver receiving a first unique signal transmitted from the transmitter of the mobile robotic device and retracts through the opening of the main housing by rotation of the reel in a second direction upon the signal receiver receiving a second unique signal transmitted from the transmitter of the mobile robotic device.

12. The charging station of claim 11, wherein the transmitter of the mobile robotic device only transmits the first unique signal when the mobile robotic device is approaching for charging and the second unique signal when charging is complete.

13. The charging station of claim 11, wherein connection between the one or more magnetic charging contacts of the charging station and the corresponding one or more magnetic charging contacts of the mobile robotic device complete an electrical charging circuit.

14. The charging station of claim 11, wherein the charging cable continues to extend until a connection between the one or more magnetic charging contacts of the charging station and the corresponding one or more magnetic charging contacts of the mobile robotic device is detected by a completed electrical charging circuit.

15. The charging station of claim 11, wherein the mobile robotic device is a mobile robotic cleaning device.

16. A charging station of a mobile robotic device comprising:
a main housing with an opening;
a signal transmitter coupled to the main housing for transmitting signals to a receiver of the mobile robotic device;
a signal receiver coupled to the main housing for receiving signals from a transmitter of the mobile robotic device;
a reel disposed within the main housing;
a motor coupled to the reel to drive rotation of the reel in two directions;
a charging cable wound around the reel with one or more magnetic charging contacts on a terminal end thereof, the one or more magnetic charging contacts of the charging cable connecting to corresponding one or more magnetic charging contacts of the mobile robotic device for charging of the mobile robotic device;
an electrical plug coupled to the main housing to connect to a power supply; and
one or more electrical elements electrically coupling the electrical plug to the charging cable and the motor,
whereby the signal transmitter of the mobile robotic device transmits return signals to the signal receiver of the charging station upon receiving signals transmitted by the signal transmitter of the charging station when approaching for charging, and whereby the charging station extends the charging cable through the opening of the main housing by rotation of the reel in a first direction upon the signal receiver of the charging station receiving the return signals transmitted from the transmitter of the mobile robotic device and retracts through the opening of the main housing by rotation of the reel in a second direction upon the signal receiver of the charging station detecting the absence of return signals transmitted from the transmitter of the mobile robotic device.

17. The charging station of claim 16, wherein the charging station extends the charging cable after the receiver receives return signals transmitted from the transmitter of the mobile robotic device for a predetermined amount of time.

18. The charging station of claim 16, wherein the charging station retracts the charging cable after the receiver detects the absence of return signals transmitted from the transmitter of the mobile robotic device for a predetermined amount of time.

19. A charging station of a mobile robotic device comprising:
- a main housing with an opening;
- a sensor coupled to the main housing for detecting the presence of the mobile robotic device within a predetermined range;
- a reel disposed within the main housing;
- a motor coupled to the reel to drive rotation of the reel in two directions;
- a charging cable wound around the reel with one or more magnetic charging contacts on a terminal end thereof, the one or more magnetic charging contacts of the charging cable connecting to corresponding one or more magnetic charging contacts of the mobile robotic device for charging of the mobile robotic device;
- an electrical plug coupled to the main housing to connect to a power supply; and
- one or more electrical elements electrically coupling the electrical plug to the charging cable and the motor, whereby the charging cable extends through the opening of the main housing by rotation of the reel in a first direction upon the sensor detecting the mobile robotic device within the predetermined range and retracts through the opening of the main housing by rotation of the reel in a second direction upon the sensor detecting the absence of the mobile robotic device within the predetermined range.

20. The charging station of claim 19, wherein the sensor comprises one or more of: imaging sensor, acoustic sensor, RF sensor, distance sensor, and IR sensor.

\* \* \* \* \*